United States Patent [19]
Bartoletto et al.

[11] Patent Number: 4,990,124
[45] Date of Patent: Feb. 5, 1991

[54] TUFF-FACE DRAG CHAIN LINK

[76] Inventors: A. J. Bartoletto, 1975 Tuckaway, Bloomfield Hills, Mich. 48013; Ronald W. T. Birchard, 395 Church Street, Beaconsfield, Quebec, Canada, H9W 3R5

[21] Appl. No.: 478,832

[22] Filed: Feb. 12, 1990

[51] Int. Cl.$^5$ .............................................. F16G 13/06
[52] U.S. Cl. .................................... 474/206; 198/850; 474/234
[58] Field of Search ............... 474/206, 210, 212, 213, 474/226, 228-234; 59/4, 5, 7, 78, 84, 85, 88, 89; 198/850-853

[56] References Cited
U.S. PATENT DOCUMENTS

| | | | |
|---|---|---|---|
| 3,665,704 | 5/1972 | Trudeau | 474/234 X |
| 4,050,323 | 9/1977 | I'Anson | 474/234 X |
| 4,198,813 | 4/1980 | Hall, Jr. | 474/234 X |
| 4,886,485 | 12/1989 | Bartoletto | 474/234 X |

Primary Examiner—Thuy M. Bui
Attorney, Agent, or Firm—Lloyd M. Forster

[57] ABSTRACT

Drag chain link typically employed for conveying cement clinker characterized by transversely ribbed underside adapted to trap a layer of clinker material for transferring a substantial portion of the normal chain wear to the clinker layer. Optionally, a grid of rectangular pocket forming ridges or other pocket forms may be employed over all or limited portions of the link face.

22 Claims, 2 Drawing Sheets

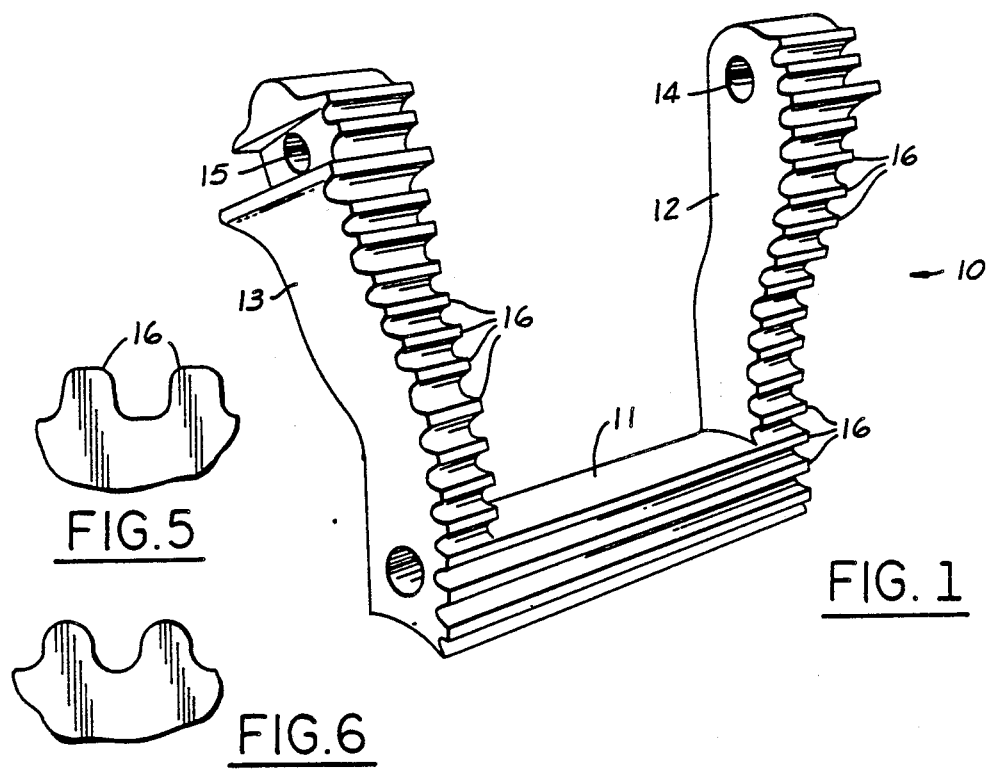
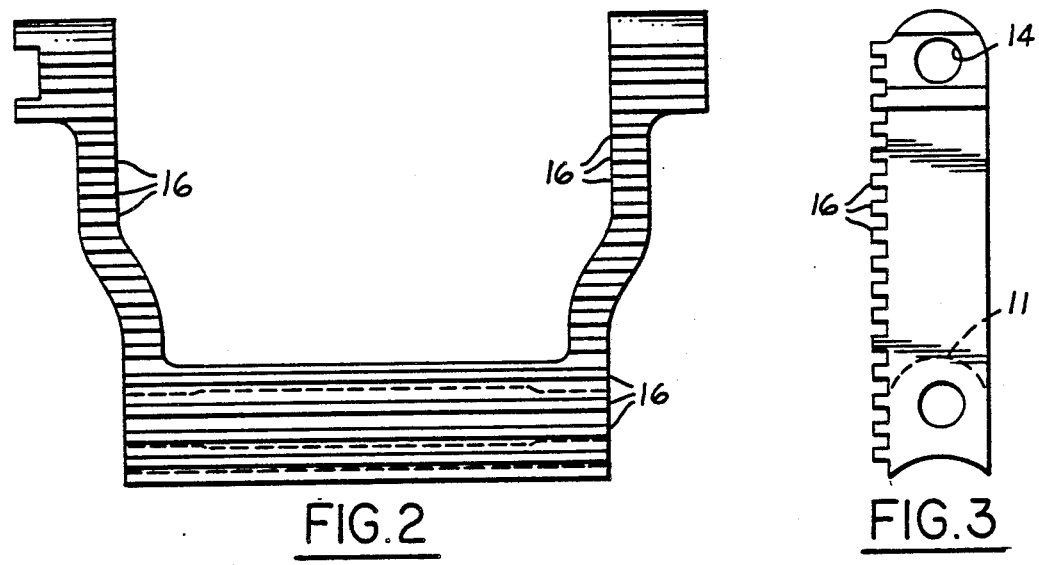

TUFF-FACE DRAG CHAIN LINK

BACKGROUND OF THE INVENTION

In drag chain transport of abrasive material such as cement clinker discharged from a rotary kiln, prior art U.S. Pat. No. 4,886,485 discloses a TAPER-LOC DRAG LINK AND PIN having the ends of the TAPER-LOC PINS adapted for press fit respectively in each of the side arm bosses of the link engaging such ends. The usual pivotal clearance fit is confined to the center barrel element of the link. The TAPER-LOC PIN is provided with a head seated in a counterbore in one of the link side arm bosses; a reduced shoulder for a tight fit in the bore extending through said side arm boss; a further reduced shaft passing through the barrel with a pivotal fit; a further reduced tapered end having a flat face driven into the other side arm boss with a tight fit in a matching tapered boss hole having a matching flat to positively prevent the TAPER-LOC PIN from rotating; and a cross locking pin press fitted into a hole through the tapered pin near that end as a redundant safety feature to positively prevent link pin extraction under any condition.

The tight fit at both ends of the TAPER-LOC PIN and the side arm holes which engage them prevent abrasive grit from entering and the matching flats prevent rotation between the TAPER-LOC PIN and the boss holes in the drag link arms, thereby greatly reducing pin wear which is the principal object of the prior patent. However, the main underface of the chain link which drags abrasive material is also subject to wear which limits the life of the chain in normal use.

BRIEF DESCRIPTION OF THE PRESENT INVENTION

In order to further minimize chain wear and thereby prolong the useful life of drag chains subject to abrasive materials, a face of the chain has now been provided with transverse ribs providing a retention feature to trap abrasive material, such as cement clinkers, and thereby provide a barrier moving with the chain against the abrasive effect of relatively sliding clinker material. This results in a substantial transfer of abrasive wear from the underface of the chain to the clinker material trapped by the ribbed construction.

In a modified embodiment, a cross ridge "waffle" grid face provides even more effective pockets for trapping abrasive material being transported as a shield against direct sliding contact of the chain face with the support bed of such material.

BRIEF DESCRIPTION OF THE DRAWINGS

FIG. 1 is a perspective view of the drag chain link having its lower face constructed in accordance with the present invention;

FIG. 2 is a bottom view of the chain link illustrated in FIG. 1;

FIG. 3 is a side elevation of the drag link shown in FIG. 2;

FIG. 4 is an end view of the chain link shown in FIGS. 2 and 3;

FIG. 5 is an enlarged fragmentary view illustrating a stub tooth form of ribs provided in the bottom surface of the drag chain link;

FIG. 6 Illustrates an alternative arcuate tooth form appropriate for dragging some materials with protective entrapment;

DETAILED DESCRIPTION OF FIRST EMBODIMENT

Figure 7:
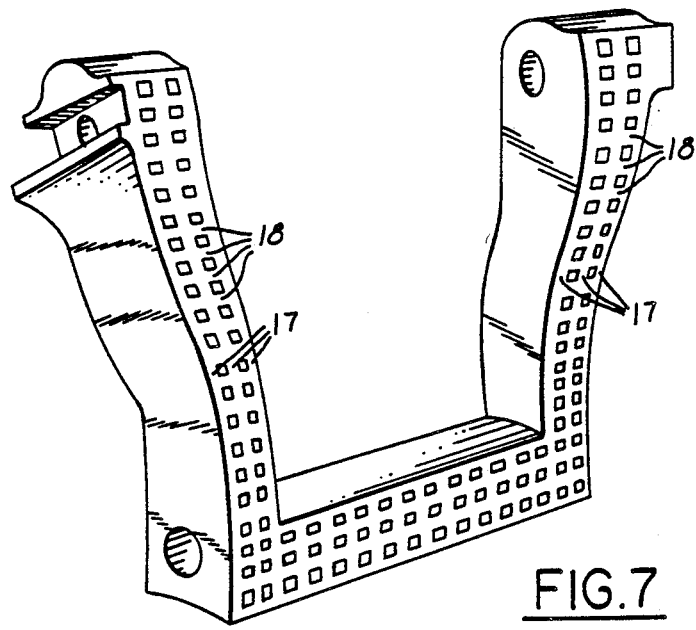
FIG. 7 is a perspective view of a chain link having an alternative "waffle" form of cross ridges providing pockets for trapping abrasive material.

With reference to FIGS. 1 and 2, bifurcated drag chain link 10 comprises central barrel 11 having integral side arm 12 for receiving the headed end of a link pivot pin not shown and side arm 13 for receiving the other end. In said prior patent, the pivot pin construction is shown in detail for connecting adjacent links with provision for preventing abrasive grit from entering boss holes 14 and 15.

The present additional transverse ribs 16 across the entire lower face of the drag link arms 12 and 13 as well as the barrel 11 provide means for trapping abrasive material such as cement clinkers to move with the drag chain link and form an interface with sublayers of clinker material so as to transfer at least a substantial part of the abrasive wear contact from the lower face of the drag chain, as encountered in typical smooth face drag links of the prior art, to the clinker material trapped by the rib construction.

The rib configuration is proportioned to effectively fill with and trap particulate chunks of cement clinker material such as discharged from rotary kiln for drag conveyance along the bottom of a trough to ball mills for final grinding at which point the drag chain in passing over a drive sprocket drops most of the trapped clinker material.

A preferred tooth form for ribs 16 is illustrated most clearly in the enlarged fragmentary FIG. 5 where essentially a stub tooth profile configuration has been found effective for the purpose.

In a typical drag link having a chain pitch in the order of 9 inches and barrel width in the order of 12 inches with arms 12 and 13 of 1 inch width, the preferred rib form for use in a typical cement clinker drag chain construction employs a 0.70 inch pitch between teeth distributed in the ratio of 0.38 inch recess and 0.32 inch tooth width with ⅛ inch root radius, 3/32 inch tooth tip corner radius and 5° draft on each tooth side. In a modified embodiment illustrated in FIG. 6, the tooth form of the ribs is again provided with 0.7 inch pitch with both root and tooth tooth formed with ⅛ inch radius arcs. The height of the radius teeth is equal to 0.37 inch.

DETAILED DESCRIPTION OF PREFERRED EMBODIMENT

Figure 8:
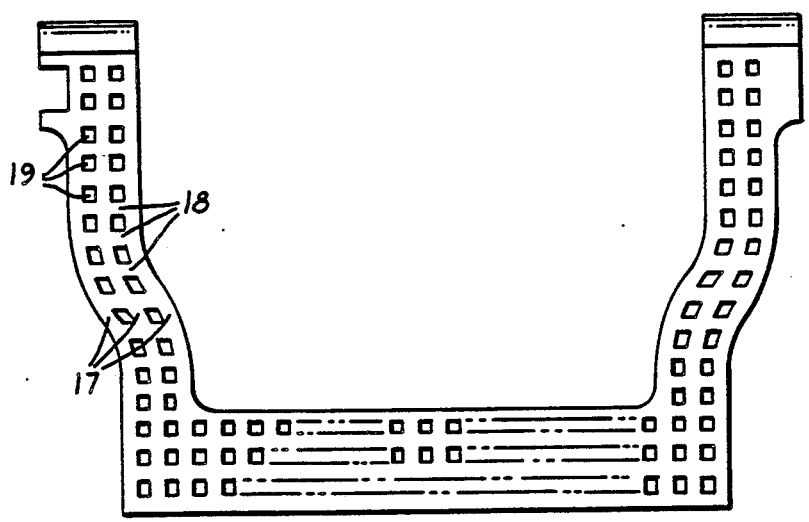
FIG. 8 is a bottom view of the modified embodiment illustrated in FIG. 7.
Figure 10:
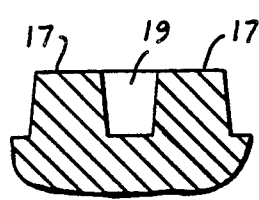
FIG. 10 is a sectional view taken along the line 10—10 of FIG. 9.
Figure 9:
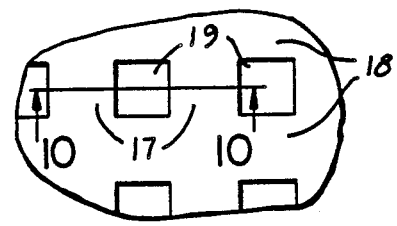
FIG. 9 an enlarged fragmentary view illustrating the pocket form of ridges provided in the bottom surface of the modified drag chain link.

With reference to FIGS. 7 and 8, a modified "waffle" texture form of vertical ridges 17 and transverse ridges 18 provide square or rectangular pockets 19 for trapping abrasive particulate material to be transported by the drag chain. Pocket recesses are similar in width and depth to the spacing between ribs in the first embodiment. A slightly greater depth than width may be employed in either embodiment to prevent spherical clinkers from bottoming out rather than wedging between ridges or within pockets thereby providing greater assurance of entrapment. Typically, cement clinkers discharged from rotary kilns may range from 1/16 to 2 inches in a round or fractured form. Occassionally oversize chunks may occur as large as 6 to 8 inches, which are broken by hammer mills prior to conveyor chain transport.

Drag chain transport is normally conducted through concrete base box tunnels which may be 2 feet wide, 2½ feet high and 150 feet long having cement clinker depth ranging from 2½ to 6 inches. Longitudinal "Ni-hard" strips are normally embedded in the concrete in 2½ foot lengths with 2 foot longitudinal and 8 to 10 inch lateral spacing and a cross section of 3 to 4 inches height on which the lower chain face rides. 30° ramps at each end provide guide in and clinker clearing exit for the chain before passing over upper return flight sprockets.

A supplemental benefit resulting from the rib construction is the fine grain texture, very hard and long wearing in nature, due to rigid mold chilling when cast.

DETAILED DESCRIPTION OF OTHER EMBODIMENTS

While rectangular pockets result from ribs extending in perpendicular relation, it will be understood that pockets of other configuration may serve an equivalent purpose in retaining cement clinkers or other abrasive particulate material, e.g., circular, oval, diamond shape or any polygon which may function to entrap particulate material projecting from the chain face in order to absorb a significant portion of abrasive wear in dragging substratas of such material.

It will also be understood that variations in the grid pattern may be provided in different areas of the chain face. For example, by providing a grid of pocket forming ridges on the central barrel portion 11 and upper arm ends of the FIGS. 1 and 2 embodiment while retaining the transverse ridge only construction in the intermediate arm positions of the link. Finally, at least partial benefits may result from any textured or ribbed construction to form a hard and long wearing face on the surface of the chain independent of the type of texturing.

What is claimed is:

1. Drag chain link characterized by link face surface formed with rib means for interengaging particulate material to be conveyed by dragging.

2. Drag chain link of claim 1 wherein ribs are proportioned to trap abrasive cement clinker material and thereby substantially transfer drag wear from chain to said trapped material.

3. Drag chain link of claim 1 wherein ribs comprise radiused convolutions.

4. Drag chain link of claim 3 wherein said radiused convolutions have a fractional inch pitch length.

5. Drag chain link of claim 4 wherein said radiused convolutions have a pitch length equal to a major fraction of an inch.

6. Drag chain link of claim 4 wherein said radiused convolutions have a pitch length equal to a major fraction of an inch in the order of 0.7 inch.

7. Drag chain link of claim 6 wherein the height of said radiused convolutions is equal to a minor fraction of an inch.

8. Drag chain link of claim 6 wherein the height of said radiused convolutions is equal to a minor fraction of an inch of approximately 0.37 inch.

9. Drag chain link of claim 1 wherein ribs comprise generally tapered stub tooth form.

10. Drag chain link of claim 9 wherein said ribs have a pitch length equal to a fraction of an inch.

11. Drag chain link of claim 9 wherein said ribs have a pitch length equal to a major fraction of an inch.

12. Drag chain link of claim 11 wherein said pitch length equals approximately 0.7 inch.

13. Drag chain link of claim 12 wherein said pitch length of approximately 0.7 inch is distributed in a ratio of approximately 0.38 inch recess width and 0.32 inch tooth width.

14. Drag chain link of claim 13 wherein said tooth form has a ⅛ inch radius base root.

15. Drag chain link of claim 14 wherein said tooth form has a 3/32 inch radius tooth tip corner.

16. Drag chain link of claim 9 wherein the tapered stub tooth form includes approximately 5° side draft.

17. Drag chain link of claim 1 wherein said rib means comprise ribs provided transverse to the direction of chain conveyance.

18. Drag chain link of claim 1 wherein said rib means comprise ribs provided to form a grid of rectangular pockets over an entire link surface.

19. Drag chain link of claim 1 wherein said rib means comprise ribs provided transverse to the direction of chain conveyance over a limited portion of a link surface with other ribs provided to form a grid of rectangular pockets over another limited portion of said link surface 20. Drag chain link of claim 1 wherein said rib means comprise ribs provided transverse to the direction of chain conveyance over a limited portion of link arms surface with other ribs provided to form a grid of rectangular pockets over the remainder of said link face surface.

21. Drag chain link of claim 1 characterized by link face surface formed with pocket recesses for interengaging particulate material to be conveyed by dragging.

22. Drag chain link characterized by a link face textured surface contributing to a hard long wearing face by interengaging particulate material to be conveyed by dragging.

* * * * *